United States Patent [19]

Anderson et al.

[11] Patent Number: 4,583,609

[45] Date of Patent: Apr. 22, 1986

[54] DRIVE AND BRAKE ASSEMBLY

[75] Inventors: James M. Anderson, Windermere; William C. Dean, Orange City, both of Fla.

[73] Assignee: FMC Corporation, Chicago, Ill.

[21] Appl. No.: 586,523

[22] Filed: Mar. 5, 1984

[51] Int. Cl.[4] .................... B60K 1/00

[52] U.S. Cl. .................... 180/65.5; 180/242; 188/18 A

[58] Field of Search .................... 180/65.5, 242; 188/18 A, 73.1, 71.1

[56] References Cited

U.S. PATENT DOCUMENTS

| | | | |
|---|---|---|---|
| 2,258,328 | 10/1941 | Lee et al. | 180/65.5 |
| 3,108,658 | 10/1963 | Bassett | 188/18 A |
| 3,161,249 | 12/1964 | Bouladon et al. | 180/65.5 |
| 3,812,928 | 5/1974 | Rockwell et al. | 180/65.5 |
| 3,892,300 | 7/1975 | Hapeman et al. | 180/65.5 |
| 4,197,926 | 4/1980 | Youngdale | 188/18 A |
| 4,228,875 | 10/1980 | Haraikawa et al. | 188/71.1 |
| 4,330,045 | 5/1982 | Myers | 180/65.5 |
| 4,343,380 | 8/1982 | Kawaguchi | 188/71.1 |
| 4,391,351 | 7/1983 | Jirousek et al. | 188/18 A |
| 4,406,340 | 9/1983 | Gennaux | 180/65.5 |

FOREIGN PATENT DOCUMENTS

| | | | |
|---|---|---|---|
| 2630206 | 3/1978 | Fed. Rep. of Germany | 180/65.5 |
| 2131506 | 6/1984 | United Kingdom | 188/18 A |

*Primary Examiner*—Albert J. Makay
*Assistant Examiner*—Steven E. Warner
*Attorney, Agent, or Firm*—Ronald C. Kamp; Richard B. Megley

[57] ABSTRACT

A drive arrangement for an aircraft belt loader having a frame, an electric motor with a releasable mounting ring, a vertical support plate affixed to the frame with a circular opening, the center thereof being elevated above the frame, a flange positioned in the opening and secured to the support plate and releasably secured to the ring, and a planetary reducer with an output housing and a mounting plate, the reducer being driven by the motor; the mounting plate releasably secured to the flange and a drive wheel affixed to the housing.

3 Claims, 3 Drawing Figures

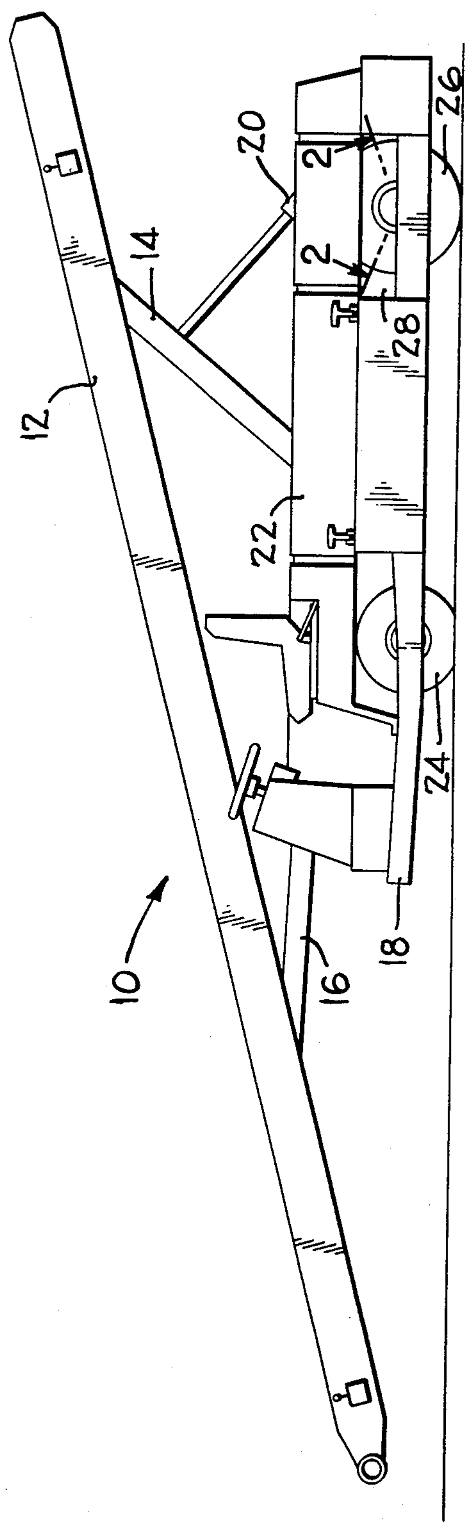
FIG_1
10
12
14
16
18
20
22
24
26
28
2
2

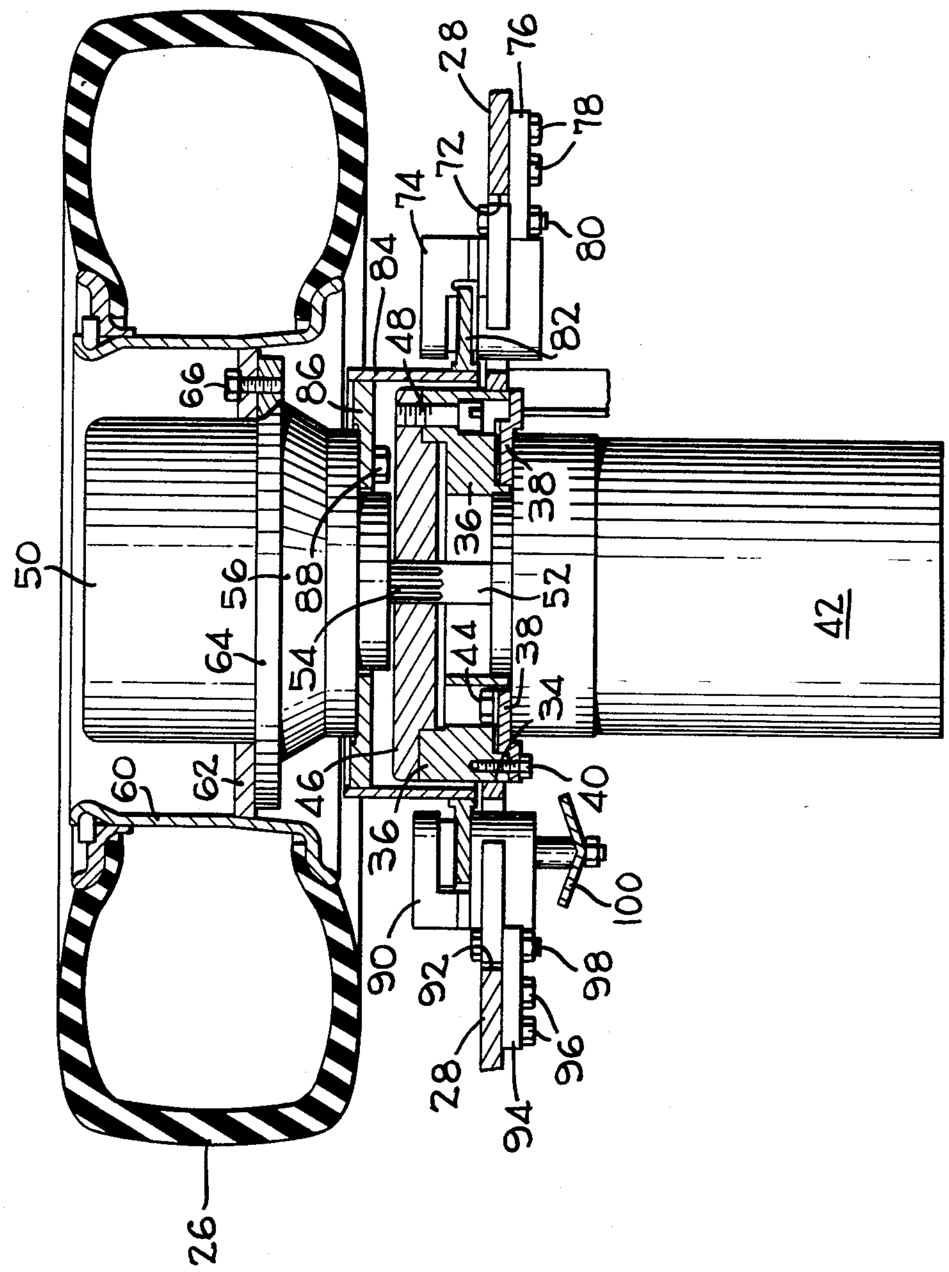
FIG_2
26
28
76
78
78
72
74
80
84
82
48
66
86
38
36
50
56
88
52
54
64
44
38
34
42
60
62
46
36
40
100
90
92
98
28
96
94

FIG_3
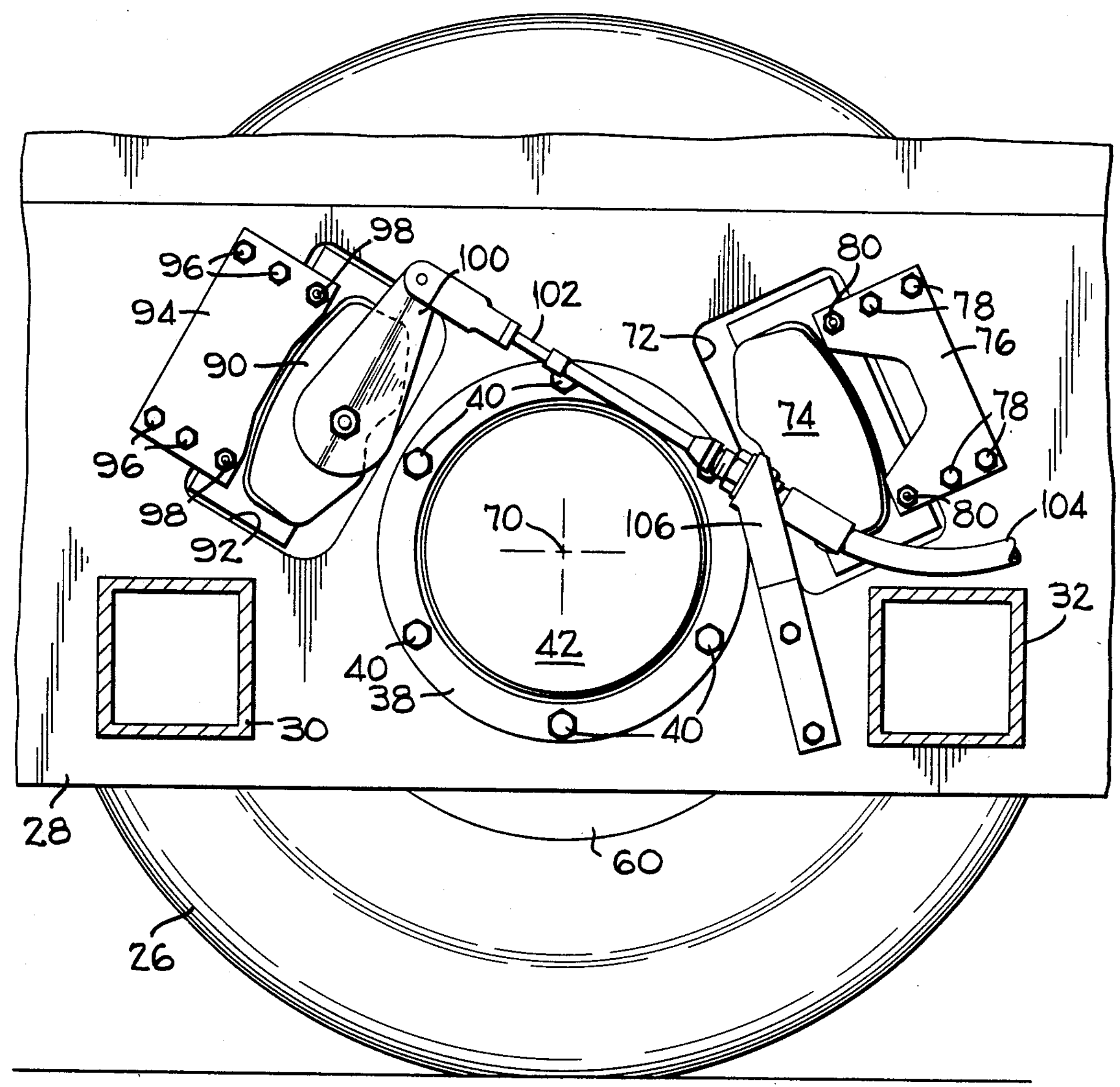

DRIVE AND BRAKE ASSEMBLY

This invention relates generally to drive and brake assemblies, and more particularly to such assemblies for use in aircraft belt loaders.

The overall height of aircraft belt loaders is important since such loaders must operate around and in close proximity to the aircraft they service. It is, therefore, desirable to provide a level frame which has an elevation from the ground which is lower than the center of rotation for the wheels supporting the loader. The present invention provides such an arrangement. It is also compact and relatively easy to assemble and service.

These and other attributes and desirable features of the present invention will become more readily apparent from a perusal of the following description and the accompanying drawings, wherein:

FIG. 1 is a side elevational view of an aircraft belt loader incorporating the present invention;

FIG. 2 is a cross-sectional view taken on line 2—2 of FIG. 1; and

FIG. 3 is a side elevational view of the invention as incorporated in FIG. 1, looking from the inside toward the outside of the loader.

Referring to FIG. 1, an aircraft belt loader is indicated generally by 10, and includes a belt conveyor 12 mounted on links 14 and 16 which are pivoted to the frame 18 of the loader and angularly controlled by independent hydraulic cylinders, one of which is shown at 20.

The power for traction and for an electric motor to drive the hydraulic pump in the hydraulic circuit is provided by a battery pack which is concealed under cover 22. The battery pack substantially fills the space between the front steerable wheel 24 and the rear drive wheel 26 on one side of the machine. The battery pack requires a level frame, at least in the length of its frame support, and to keep the wheel base as short as possible, the frame must be level. The overall height of the loader must be as low as possible, which requires that the frame be below the axis of rotation of the drive wheel 26, at least for tire diameters commercially available and capable of carrying the loads imposed thereon by the loader.

A vertical plate 28 is attached to the ends of box members 30 and 32 which form a part of the frame 12, as best seen in FIG. 3. A circular opening 34 is provided in the plate 28 and a circular flange member 36 fits into the opening and is secured, such as by welding, to the plate 28. A ring 38 is attached to the flange 36 by means of cap screws or bolts 40 and to an electric motor 42 by bolts 44. The flange 36 is piloted on a mounting plate 46 and secured thereto by bolts 48. The mounting plate 46 is part of a planetary reducer 50 sold by the Fairfield Manufacturing Company of Lafayette, Ind. and referred to as "Torque-Hubs". The output shaft 52 of electric motor 42 is splined at 54 to mate with a compatable, internally splined connector in the planetary drive. The output of the drive 50 is through its rotating casing or housing 56. A drive wheel 58 includes a rim 60 to which an interior flange 62 is welded. The flange 62 is attached to a flange 64 on casing 56 by bolts 66.

The center of rotation for the wheel 58 is aligned with the center of rotation for the motor 42 as represented by the dot 70 on FIG. 3. It can be seen that the center 70 is above the box members 30 and 32. The frame 12 can, therefore, be level, i.e. not utilize any bends in a vertical plane, to provide a platform for the battery pack. The wheelbase can be maintained as short as possible and the proper sized tire to accomodate the loading utilized.

The support plate 28 has a cut-out or opening 72 to accept a hydraulically activated disk brake 74. The brake 74 is retained within the cut-out 72 by a plate 76 held on the plate 28 by bolts 78 and secured to the brake 74 by bolts 80. A rotor 82 mounted to rotate between the caliper of brake 74 by being secured to a sleeve 84 affixed to a ring 86 which is bolted to the casing 56 by bolts 88. A mechanically-actuated parking brake 90 may also be provided. This brake is also secured within a cut-out or opening 92 in the support plate 28 and held by a plate 94; bolts 96 attaching the plate 94 to the plate 28 and bolts 98 attaching the plate 94 to the brake 90. The brake 90 includes a rotatable lever 100 which is pivotally attached to the actuator wire 102 which is reciprocable with a sheath 104 of a Bowden cable. The sheath is mounted on the plate 28 by a bracket 106. The compactness of this arrangement is apparent from FIG. 2, which shows that the rotor 82 extends only a short distance from the tire in the inboard/outboard direction and occupies no more space in this direction than the mounting of the planetary drive. Also, both of the brakes 74 and 70 are mounted to take advantage of the support plates' thickness to reduce the space required, in an inboard/outboard direction. The major extension of these brakes is toward the wheel 58 which is a distance already spanned by the mounting of the planetary drive 50. The arrangement of the present invention permits a compact drive and brake arrangement, which is especially useful in aircraft belt loaders wherein clearance, for the links and associated cylinders, dictates that the motor/wheel distance be kept to a minimum.

While a preferred embodiment of the present invention has been shown and described herein, various modifications may be made without departing from the spirit of the invention as defined by the scope of the appended claims.

What is claimed is:

1. In an aircraft belt loader having a frame, a drive arrangement to achieve a level frame which is below the center of wheel rotation, comprising:

an electric motor having an output shaft;

a mounting ring releasably secured to said motor;

a vertical support plate affixed to said frame and having a circular opening therein;

said circular opening having a center elevated above said frame;

a flange positioned in said opening and secured to said support plate;

first means releasably securing said ring to said flange;

a planetary reducer having an input connection for receipt of said output shaft;

said reducer having a rotatable output housing and a mounting plate rotatably supporting said drive;

second means releasably securing said mounting plate to said flange; and a ground-engaging drive wheel affixed to said housing.

2. The invention according to claim 1, and further comprising:

a brake ring secured to said housing;

a sleeve affixed to said brake ring;

a rotor affixed to said sleeve; and a hydraulically-actuated caliper carried by said support plate for engagement with said rotor.

3. The invention according to claim 2, and further comprising:

a mechanically actuated brake carried by said support plate and engageable with said rotor.

* * * * *